US011651707B2

(12) United States Patent
Li

(10) Patent No.: US 11,651,707 B2
(45) Date of Patent: May 16, 2023

(54) METHOD AND APPARATUS FOR ENCRYPTING AND DECRYPTING USER DATA

(71) Applicant: Silicon Motion, Inc., Zhubei (TW)

(72) Inventor: An-Pang Li, New Taipei (TW)

(73) Assignee: SILICON MOTION, INC., Zhubei (TW)

(*) Notice: Subject to any disclaimer, the term of this patent is extended or adjusted under 35 U.S.C. 154(b) by 568 days.

(21) Appl. No.: 16/704,688

(22) Filed: Dec. 5, 2019

(65) Prior Publication Data

US 2020/0402426 A1 Dec. 24, 2020

Related U.S. Application Data

(60) Provisional application No. 62/864,038, filed on Jun. 20, 2019.

(30) Foreign Application Priority Data

Jul. 19, 2019 (CN) .......................... 201910655617.X

(51) Int. Cl.
*H04L 9/06* (2006.01)
*G09C 1/00* (2006.01)
(Continued)

(52) U.S. Cl.
CPC ........... *G09C 1/00* (2013.01); *G06F 12/0246* (2013.01); *G06F 21/602* (2013.01); *H03M 13/09* (2013.01);
(Continued)

(58) Field of Classification Search
CPC ............... G06F 12/0246; G06F 21/602; G06F 2212/7202; G06F 12/1408;
(Continued)

(56) References Cited

U.S. PATENT DOCUMENTS 7,822,207 B2 * 10/2010 Douguet ................. H04L 9/004
713/192
2003/0058862 A1 * 3/2003 Lansing ............... H04N 21/437
348/E7.071
(Continued)

FOREIGN PATENT DOCUMENTS

CN 103258172 A 8/2013
TW I411932 B 10/2013
(Continued)

OTHER PUBLICATIONS

STANlite—A Database Engine for Secure Data Processing at Rack-Scale Level, Sartakov et al., Apr. 2018 (Year: 2018).*
(Continued)

*Primary Examiner* — Jahangir Kabir
(74) *Attorney, Agent, or Firm* — Birch, Stewart, Kolasch & Birch, LLP

(57) ABSTRACT

The invention introduces an apparatus for encrypting and decrypting user data, including a memory, a bypass-flag writing circuit and a flash interface controller. The bypass-flag writing circuit writes a bypass flag in a remaining bit of space of the memory that is originally allocated for storing an End-to-End Data Path Protection (E2E DPP), where the bypass flag indicates whether user data has been encrypted. The flash interface controller reads the user data, the E2E DPP and the bypass flag from the memory and programs the user data, the E2E DPP and the bypass flag into the flash device.

16 Claims, 8 Drawing Sheets

(51) Int. Cl.
*H03M 13/09* (2006.01)
*G06F 12/02* (2006.01)
*G06F 21/60* (2013.01)

(52) U.S. Cl.
CPC .... *H04L 9/0631* (2013.01); *G06F 2212/7202* (2013.01)

(58) Field of Classification Search
CPC ..... G06F 2212/1052; G06F 2212/7204; G06F 11/1004; H04L 9/0631; H04L 2209/12; G09C 1/00; H03M 13/09
USPC .......................................................... 380/28
See application file for complete search history.

(56) References Cited

U.S. PATENT DOCUMENTS

| | | |
|---|---|---|
| 2006/0242429 A1 | 10/2006 | Holtzman et al. |
| 2007/0180539 A1 | 8/2007 | Holtzman et al. |
| 2009/0006886 A1 | 1/2009 | O'Connor et al. |
| 2009/0320012 A1* | 12/2009 | Lee ........................... G06F 8/65 714/758 |
| 2011/0019814 A1* | 1/2011 | Hasting ................. H04L 9/0643 714/E11.032 |
| 2014/0075206 A1 | 3/2014 | Herman et al. |
| 2015/0095663 A1* | 4/2015 | Seng ........................ G06F 21/79 713/193 |
| 2016/0232109 A1* | 8/2016 | Canter .................. G06F 3/0623 |
| 2017/0177368 A1* | 6/2017 | DeHon ............... G06F 12/1458 |
| 2018/0316435 A1* | 11/2018 | Remein ............. H04Q 11/0067 |
| 2019/0129866 A1 | 5/2019 | Peng et al. |

FOREIGN PATENT DOCUMENTS

| | | |
|---|---|---|
| TW | I430084 B | 3/2014 |
| TW | I659329 B | 5/2019 |

OTHER PUBLICATIONS

English translationa of the Taiwanese Search Report, dated Jul. 24, 2020, for Taiwanese Application No. 108125643.

* cited by examiner

METHOD AND APPARATUS FOR ENCRYPTING AND DECRYPTING USER DATA

CROSS-REFERENCE TO RELATED APPLICATIONS

This application claims the benefit of priority to U.S. Provisional Application Ser. No. 62/864,038, filed on Jun. 20, 2019; and Patent Application No. 201910655617.x, filed in China on Jul. 19, 2019; the entirety of which is incorporated herein by reference for all purposes.

BACKGROUND

The disclosure generally relates to storage devices and, more particularly, to methods and apparatuses for encrypting and decrypting user data.

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation).

If there are security considerations for user data, flash memory devices apply an encryption algorithm to user data before programming it into a storage unit, so as to enhance the data security. For the efficiency of data programming or read, the encryption and the decryption algorithms are typically realized by hardware. In addition, a bypass path is provided to make user data provided by the host not to undergo the encryption hardware and directly programmed into a storage unit, or make read data not to undergo the decryption hardware and directly replied to the host. However, the arrangement and configuration for the encryption, the decryption and the bypass path affect the overall system performance. Thus, it is desirable to have methods and apparatuses for encrypting and decrypting user data to efficiently arrange and configure encryption, decryption and bypass paths.

SUMMARY

In an aspect of the invention, an apparatus for encrypting and decrypting user data is introduced to include a memory, a bypass-flag writing circuit and a flash interface controller. The bypass-flag writing circuit writes a bypass flag in a remaining bit of space of the memory that is originally allocated for storing an End-to-End Data Path Protection (E2E DPP), where the bypass flag indicates whether user data has been encrypted. The flash interface controller reads the user data, the E2E DPP and the bypass flag from the memory and programs the user data, the E2E DPP and the bypass flag into the flash device.

In another aspect of the invention, an apparatus for encrypting and decrypting user data is introduced to include a flash interface controller, a user-data and flag checker, and an encryption-and-decryption controller. The flash interface controller reads user data and a bypass flag from the flash device and stores the user data and the bypass flag in a memory, where the bypass flag is stored in a remaining bit of space of the memory that is originally allocated for storing an E2E DPP to indicate whether the user data has been encrypted. The user-data and flag checker outputs the bypass flag received from the flash interface controller. The encryption-and-decryption controller receives the bypass flag, configures a decryption path or a bypass path that makes the user data passed through according to the bypass flag, where the decryption path comprises an encryption-and-decryption engine, the bypass path does not include the encryption-and-decryption engine, and the encryption-and-decryption engine decrypts the user data using a key.

In still another aspect of the invention, a method for encrypting and decrypting user data to include steps: programming user data, an E2E DPP and a bypass flag into a flash device, where the bypass flag is stored in a remaining bit of space of the flash device that is originally allocated for storing the E2E DPP, and the bypass flag indicates whether the user data has been encrypted.

In still another aspect of the invention, a method for encrypting and decrypting user data to include steps: reading a bypass flag from a flash device, where the bypass flag is stored in a remaining bit of space of the flash device that is originally allocated for storing an E2E DPP, and the bypass flag indicates whether the user data has been encrypted; configuring a decryption path or a bypass path that makes the user data passed through according to the bypass flag, where the decryption path comprises an encryption-and-decryption engine, the bypass path does not include the encryption-and-decryption engine and the encryption-and-decryption engine decrypts the user data using a key; and outputting the user data or the decrypted user data to a host-side.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
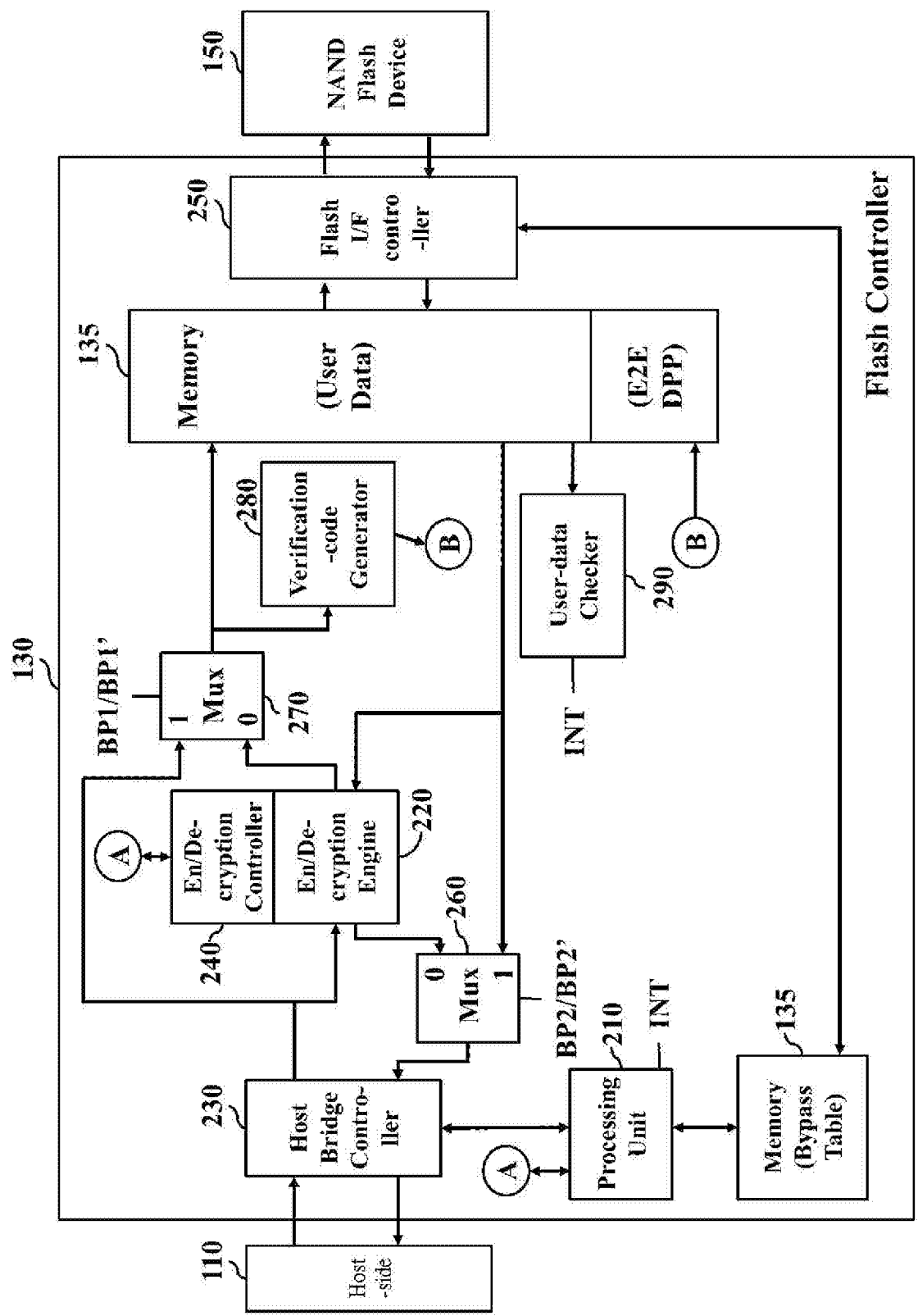
FIG. 1 is the system architecture according to some implementations.

Refer to FIG. 1. The system architecture 100 includes a host-side 110, a flash controller 130 and a NAND flash device 150. The system architecture may be practiced in a Personal Computer (PC), a laptop PC, a notebook, a mobile phone, a digital camera, a digital recorder, or other consumer electronic products. The flash controller 130 and the NAND flash device 150 may be referred to as a Solid State Disk (SSD). The flash controller 130 includes a processing unit 210 communicating with the host-side 110 via a host bridge controller 230. The host bridge controller 230 may include Universal Flash Storage (UFS), Non-Volatile Memory Express (NVMe), Universal Serial Bus (USB), Advanced Technology Attachment (ATA), Serial Advanced Technology Attachment (SATA) Peripheral Component Interconnect Express (PCI-E) interface (I/F), or others. The processing unit 210 may communicate with the NAND flash device 150 via a flash I/F controller 250 and the flash I/F controller 250 may include Open NAND Flash Interface (ONFI), Double Data Rate (DDR) Toggle interface, or others. The NAND flash device 150 provides huge storage space, typically in hundred gigabytes (GBs) or even terabytes (TBs), for storing huge user data, for example, high-resolution images, videos, or others. Memory units of the NAND flash device 150 may be Single Level Cells (SLCs), Multi-Level Cells (MLCs), Triple Level Cells (TLCs), Quad-Level Cells (QLCs), or any combinations thereof.

The flash controller 130 includes an encryption-and-decryption engine 220 to encrypt and decrypt user data using the same key. The encryption-and-decryption engine 220 coupled between the host bridge controller 230 and a multiplexer 270 may be a Data Encryption Standard (DES) engine, an Advanced Encryption Standard (AES) engine, or others using a symmetric-key algorithm. The encryption-and-decryption engine 220 preferably contains circuits implementing the AES algorithm that relies on hardware and real-time performs without sacrificing performance. Specifically, the AES engine 220 receives user data through the host bridge controller 230, encrypts the user data using a key and transmits the encrypted user data to a memory 135 and a verification-code generator 280 through a multiplexer (Mux) 270. On the other hand, the AES engine 220 reads the encrypted user data from the memory 135, decrypts the read one using the same key and transmits the decrypted one to the host bridge controller 230 through a Mux 280, making decrypted user data transmitted to the host-side 110 through the host bridge controller 230. The processing unit 210 may drive an encryption-and-decryption controller 240 to set parameters of the encryption-and-decryption engine 220.

For a data write operation, the flash controller 130 includes two paths: an encryption path; and a bypass path. For a host write command, the processing unit 210 may issue a signal BP1/BP1' to the Mux 270 for configuring components of the flash controller 130 to form the encryption path or the bypass path. In some embodiments, the host-side 110 may set a designated register (not shown in FIG. 1) of the flash controller 130 to inform the flash controller 130 if an encryption function is activated. In alternative embodiments, the host-side 110 may transmit information indicating whether the user data to be written requires the encryption carried by the host write command to the flash controller 130. The Mux 270 is coupled between the host bridge controller 230, the encryption-and-decryption engine 220, the verification-code generator 280 and the memory 135. When the host-side 110 instructs the flash controller 130 to activate the encryption function, the processing unit 210 issues the signal BP1' to the Mux 270 for connecting the input of the Mux 270 to the encryption-and-decryption engine 220 to form the encryption path. Otherwise, the processing unit 210 issues the signal BP1 to the Mux 270 for connecting the input of the Mux 270 to the host bridge controller 230 to form the bypass path.

For a data read operation, the flash controller 130 includes two paths: a decryption path; and a bypass path. For a host read command, the processing unit 210 may issue a signal BP2/BP2' to the Mux 260 for configuring components of the flash controller 130 to form the decryption path or the bypass path. The Mux 260 is coupled between the host bridge controller 230, the encryption-and-decryption engine 220 and the memory 135. When detecting that a decryption function requires to activate, the processing unit 210 issues the signal BP2' to the Mux 260 for connecting the input of the Mux 260 to the encryption-and-decryption engine 220 to form the decryption path. Otherwise, the processing unit 210 issues the signal BP2 to the Mux 260 for connecting the input of the Mux 260 to the memory 135 to form the bypass path. Details of detecting whether the decryption function requires to activate will be described in the following paragraphs.

The verification-code generator 280 coupled between the Mux 270 and the memory 135 receives user data (may be raw data or encrypted data) from the Mux 270, generates an End-to-End Data Path Protection (E2E DPP) according to the user data, which is used to verify whether the user data has error bits, and stores the E2E DPP in a designated address of the memory 135. The verification-code generator 280 may include the Cyclic Redundancy Check (CRC) encoder, the Hamming code encoder or other similar encoding circuits. Assume that a logical address points to user data of 512 bytes (may be referred to as one sector): The verification-code generator 280 generates the E2E DPP of 15 bits according to the user data of 512 bytes. The memory 135 may be a Dynamic Random Access Memory (DRAM), a Static Random Access Memory (SRAM) and is employed as a data buffer for the user data and the E2E DPP. The flash I/F controller 250 coupled between the memory 135 and the NAND flash device 150 reads the user data and the E2E DPP from the memory 135 and programs them into a physical block of the NAND flash device 150.

The flash I/F controller 250 reads the user data and the E2E DPP from the NAND flash device 150 and writes them in a designated address of the memory 135. A user-data checker 290 coupled between the processing unit 210 and the memory 135 reads the user data (may be raw data or encrypted data) and the E2E DPP from the memory 135 and determines whether the read data is correct accordingly. The user-data checker 290 may include the CRC decoder, the Hamming code decoder or other similar decoding circuits. When detecting any errors presented in the read one, the user-data checker 290 issues an interrupt signal INT to the processing unit 210, enabling the processing unit 210 to start an error recovery procedure.

To improve the efficiency of a data write operation, user data and E2E DPP for different host write commands are collected and programmed into an active block, resulting in the user data of some sectors of the active block is encrypted while the user data of the other sectors of the active block is not encrypted. To record information indicating whether the user data of each sector has been encrypted, in some implementations, the processing unit 210 may maintain a bypass table corresponding to the active block in the memory 135. The bypass table may be realized by a bitmap including bits with a quantity corresponding to a total amount of the sectors of the active block. Each bit records information indicating whether the user data of a corresponding sector has been encrypted. For example, if a total amount of the sectors of the active block is 32, then the bypass table is a 32-bit bitmap. However, the bypass table occupy certain space of the memory 135 and the flash I/F controller 250 requires to spend time and its bandwidth to program the corresponding bypass table into a designated address of the NAND flash device 150 when the active block is full. Moreover, to complete each host read operation, the flash I/F controller 250 requires to spend time and its bandwidth to read the corresponding bypass table, and then configure the flash controller 130 to form the decryption path or the bypass path according to the information of the bypass table.

Figure 6:
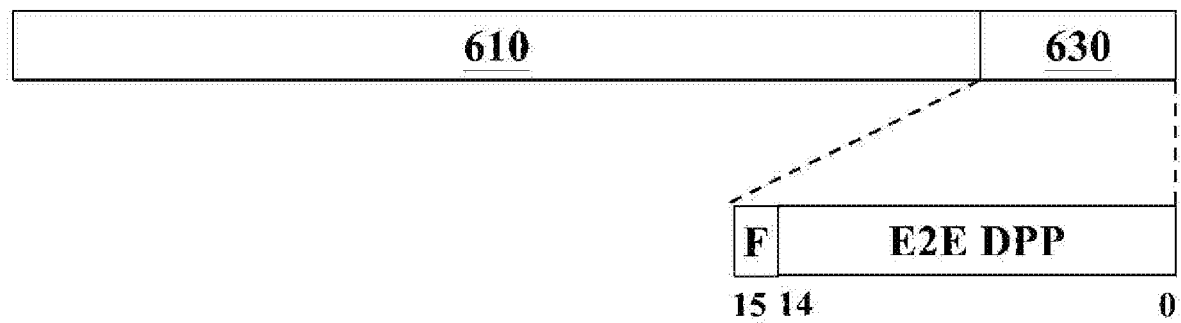
FIG. 6 shows the data organization of an End-to-End Data Path Protection (E2E DPP) according to an embodiment of the invention.

Refer to FIG. 6. To save the space of the memory 135 and the NAND flash device 150, and the time for programming and reading user data, embodiments of the invention introduce to use the remaining one bit of space 630 of the memory 135 or the NAND flash device 150, which is originally allocated for storing the E2E DPP, to store information indicating whether the user data 610 of each sector has been encrypted. For example, when a 15-bit E2E DPP is recorded in space of two bytes, the remaining one bit (for example, the Most Significant Bit—MSB or the Least Significant Bit—LSB) is used to record a bypass flag indicating whether the corresponding 512 KB user data has been encrypted, where "1" indicates that the corresponding user data hasn't been encrypted (that is, went through the bypass path) and "0" indicates that the corresponding user data has been encrypted (that is, went through the encryption path). In alternative embodiments, it may allocate space of 4 bytes for a E2E DPP, but the E2E DPP actually uses 31 bits or less.

Figure 2:
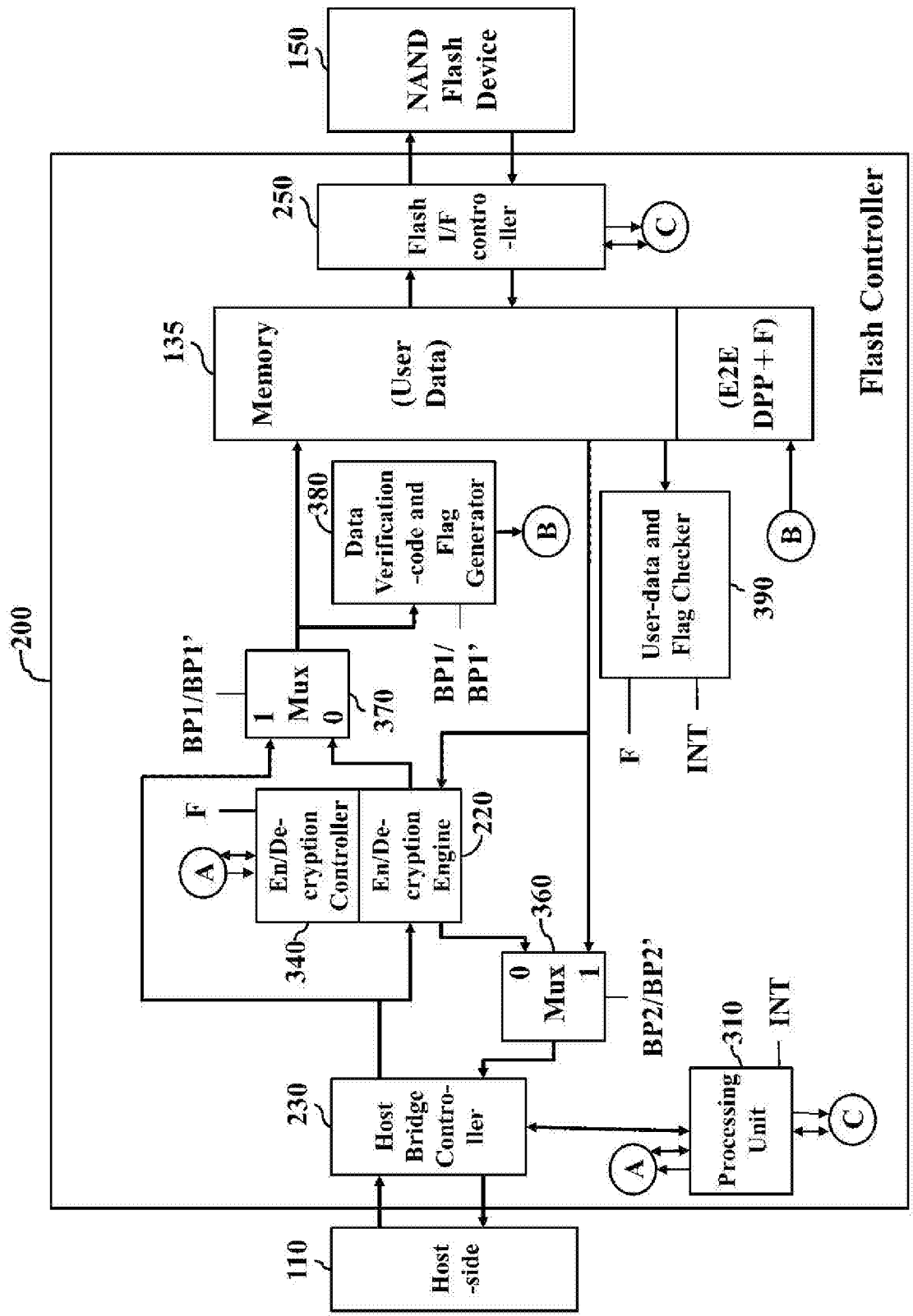
FIG. 2 is the system architecture according to an embodiment of the invention.

To store the aforementioned bypass flag in the space that is originally allocated for an E2E DPP, functions, circuits and interconnections of several components of FIG. 1 may be modified. Refer to FIG. 2 showing an embodiment of the modified system architecture. A flash controller 200 is equipped with a processing unit 310, an encryption-and-decryption controller 340, a Mux 370 and a data verification-code and flag generator 380. The processing unit 310 interprets that a command received from the host bridge controller 230 is a host write command, and determines whether the host-side 110 instructs the flash controller 130 to activate an encryption function. When the encryption function is not activated, the processing unit 310 issues a control signal to the encryption-and-decryption controller 340 to inform the encryption-and-decryption controller 340 that user data requires no encryption. The encryption-and-decryption controller 340 issues a signal BP1 to the Mux 370 for connecting the input of the Mux 370 to the host bridge controller 230 to form the bypass path. Additionally, the encryption-and-decryption controller 340 issues the signal BP1 to the data verification-code and flag generator 380 for driving the data verification-code and flag generator 380 to generate a bypass flag indicating that the corresponding user data hasn't been encrypted and store the bypass flag together with the E2E DPP in a designated address of the memory 135.

When the encryption function is activated, the processing unit 310 issues a control signal to the encryption-and-decryption controller 340 to inform the encryption-and-decryption controller 340 that user data requires an encryption. The encryption-and-decryption controller 340 issues a signal BP1' to the Mux 370 for connecting the input of the Mux 370 to the encryption-and-decryption engine 220 to form the encryption path. Additionally, the encryption-and-decryption controller 340 issues the signal BP1' to the data verification-code and flag generator 380 for driving the data verification-code and flag generator 380 to generate a bypass flag indicating that the corresponding user data has been encrypted and store the bypass flag together with the E2E DPP in a designated address of the memory 135.

Figure 3:
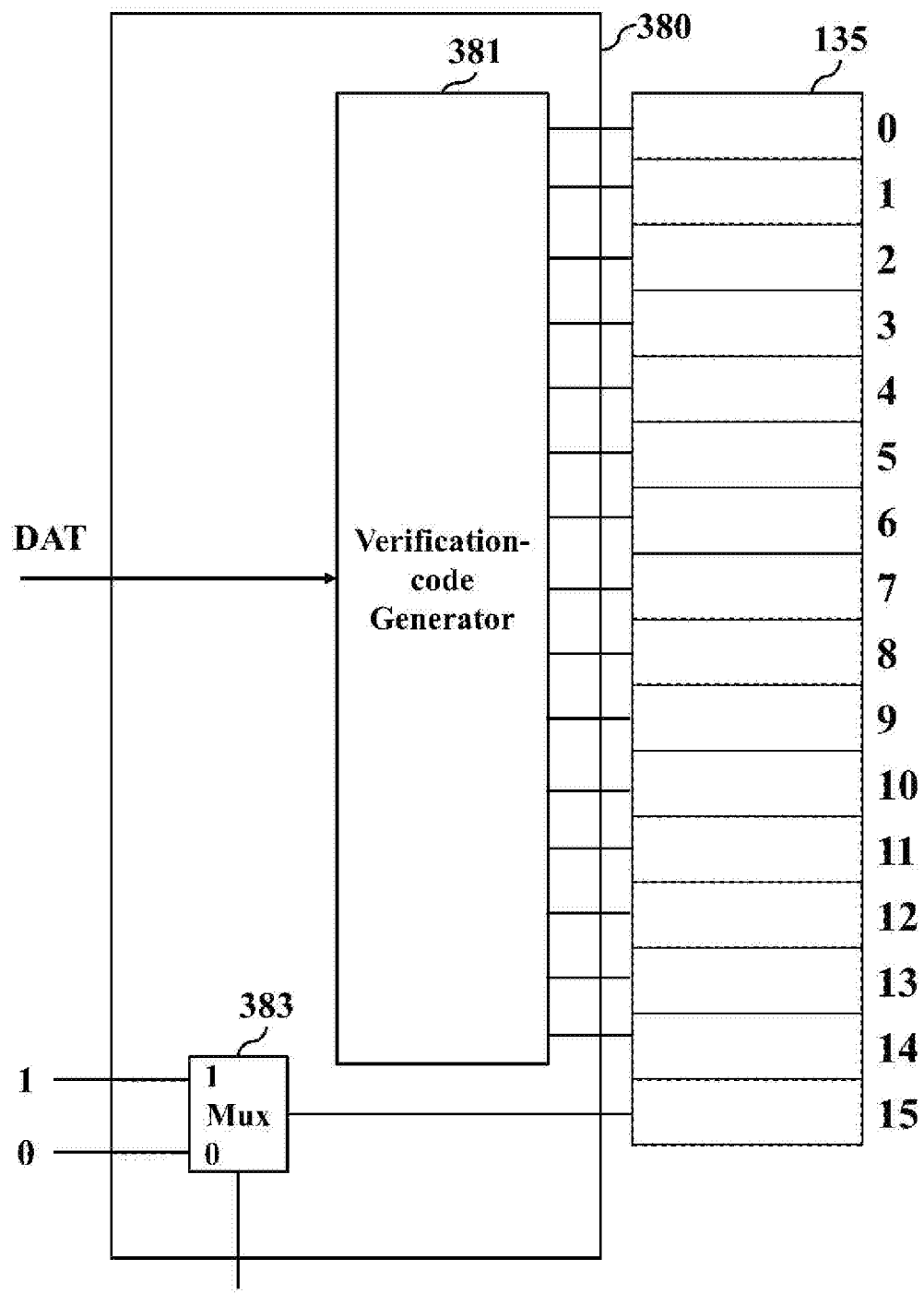
FIG. 3 is a block diagram of a data verification-code and flag generator according to another embodiment of the invention.

Refer FIG. 3. The data verification-code and flag generator 380 includes a verification-code generator 381 and a Mux 383. Functions and circuits of the verification-code generator 381 are similar with the verification-code generator 280 of FIG. 1. The verification-code generator 381 may be a CRC encoder that generates a 15-bit E2E DPP according to user data DAT (may be raw data or encrypted data) of one sector (such as 512 KB) and outputs it to the designated address Addr[14:0] of the memory 135. The Mux 383 is controlled by the encryption-and-decryption controller 340. When receiving the signal BP1 from the encryption-and-decryption controller 340, the Mux 383 outputs "1" indicating that the user data DAT hasn't been encrypted to the designated address Addr[15] of the memory 135. When receiving the signal BP1' from the encryption-and-decryption controller 340, the Mux 383 outputs "0" indicating that the user data DAT has been encrypted to the designated address Addr[15] of the memory 135. Those artisans may devise the architecture as shown in FIG. 3 to make the verification-code generator 381 output the 15-bit E2E DPP to the designated address Addr[15:1] of the memory 135 and the Mux 383 output the bypass flag to the designated address Addr[0].

The processing unit 310 subsequently drives the flash I/F controller 250 to program the user data, the E2E DPP and the bypass flag of the memory 135 into one sector of an empty page of the active block of the NAND flash device 150.

To determine whether user data requires to decrypt by interpreting a bypass flag of space that is originally allocated for an E2E DPP, functions, circuits and interconnections of several components of FIG. 1 may be modified. Refer to FIG. 2 showing an embodiment of the modified system architecture. The flash controller 200 is equipped with a user-data and flag checker 390 and a Mux 360. The user-data and flag checker 390 is coupled between the memory 135, the encryption-and-decryption controller 340 and the processing unit 310. The encryption-and-decryption controller 340 is coupled to the Mux 360. When interpreting that the received command from the host bridge controller 230 is a host read command, the processing unit 310 drives the flash I/F controller 250 to read user data, an E2E DPP and a bypass flag from a designated sector of a designated page of a designated physical block of the NAND flash device 150 and store them in the memory 135. The user-data and flag checker 390 reads the bypass flag F from the memory 135 and outputs it to the encryption-and-decryption controller 340. The user-data and flag checker 390 includes the user-data checker 290 as shown in FIG. 2 for determining the accuracy of user data. The encryption-and-decryption controller 340 determines whether the flash controller 130 activates the decryption function according to the bypass flag F. When the decryption function is not activated, the encryption-and-decryption controller 340 issues a signal BP2 to the Mux 360 for connecting the input of the Mux 360 to the memory 135 to form the bypass path. When the decryption function is activated, the encryption-and-decryption controller 340 issues a signal BP2' to the Mux 360 for connecting the input of the Mux 360 to the encryption-and-decryption engine 220 to form the decryption path.

Subsequently, when the user data (may be raw data or the encrypted data) has passed the examination by the user-data and flag checker 390 (in other words, the processing unit 310 does not receive the interrupt signal INT issued by the user-data and flag checker 390), the processing unit 310 drives the host bridge controller 230 to receive the user data from the MUX 360 and output it to the host-side 110.

Functions, circuits and operations of other components of the flash controller 200 that are not described, and generic functions, circuits and operations of the components with the same names, as shown in the flash controller 200, may refer to the descriptions of the corresponding components of FIG. 1, and are omitted herein for brevity.

Figure 4:
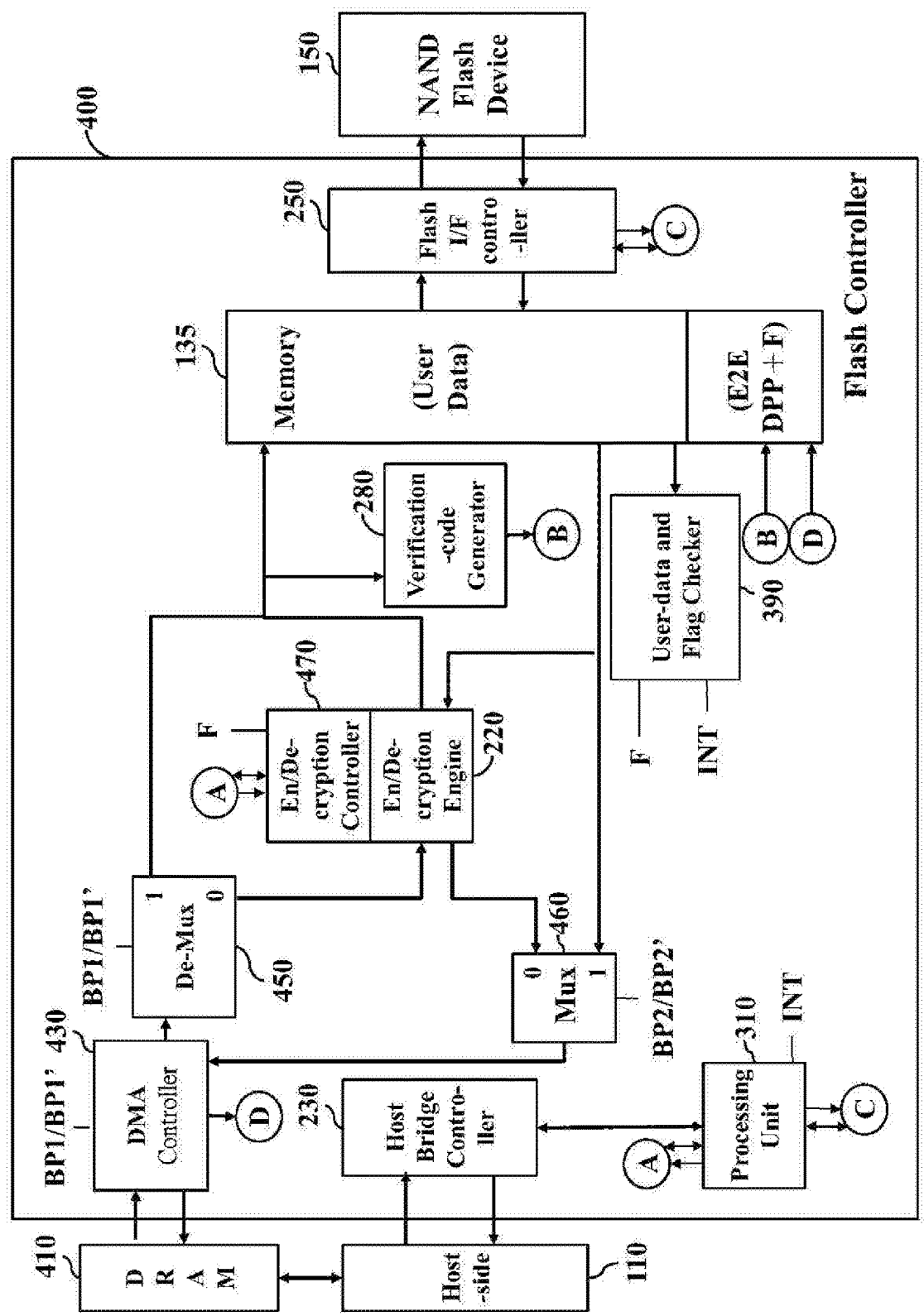
FIGS. 4 and 5 are the system architectures according to embodiments of the invention.

In some embodiments, user data to be programmed is stored in a DRAM outside of a flash controller and the flash controller stores user data read from a NAND flash device in the DRAM for an acquisition by the host-side 110. Reflecting to the above user-data access mechanism, functions, circuits and interconnections of several components of FIG. 2 may be modified and the modified results may refer to FIG. 4.

For a data write operation, the flash controller is equipped with a Direct Memory Access (DMA) controller 430 coupled between the DRAM 410 and the De-multiplexer (De-Mux) 450. When the encryption function is not activated, an encryption-and-decryption controller 470 issues a signal BP1 to the De-Mux 450 for connecting the output of the De-Mux 450 to the memory 135 to form a bypass path. In addition, the encryption-and-decryption controller 470 issues a signal BP1 to the DMA controller 430, enabling the DMA controller 430 to output the bypass flag being "1" indicating that the corresponding user data hasn't been encrypted to the remaining bit of the space of the memory 135 that is originally allocated to store an E2E DPP.

When the encryption function is activated, the encryption-and-decryption controller 470 issues a signal BP1' to the De-Mux 450 for connecting the output of the De-Mux 450 to the encryption-and-decryption engine 220 to form an encryption path. In addition, the encryption-and-decryption controller 470 issues a signal BP1' to the DMA controller 430, enabling the DMA controller 430 to output the bypass flag being "0" indicating that the corresponding user data has been encrypted to the remaining bit of the space of the memory 135 that is originally allocated to store an E2E DPP.

For a data read operation, the flash controller 400 is equipped with a Mux 460 coupled between the DMA controller 430, the encryption-and-decryption engine 220 and the memory 135. When the decryption function is not activated, the encryption-and-decryption controller 470 issues a signal BP2 to the Mux 460 for connecting the input of the Mux 460 to the memory 135 to form a bypass path. When the decryption function is activated, the encryption-and-decryption controller 470 issues a signal BP2' to the Mux 460 for connecting the input of the Mux 460 to the encryption-and-decryption engine 220 to form a decryption path. The output of the Mux 460 is coupled to the DMA controller 430, enabling the DMA controller 430 to obtain the raw or the decrypted user data through the Mux 460. The DMA controller 430 stores the obtained user data in a designated address of the DRAM 410, enabling the host-side 110 to access the user data of the DRAM 410.

Functions, circuits and operations of other components of the flash controller 400 that are not described, and generic functions, circuits and operations of the components with the same names, as shown in the flash controller 400, may refer to the descriptions of the corresponding components of FIGS. 1 and 2, and are omitted herein for brevity.

Figure 5:
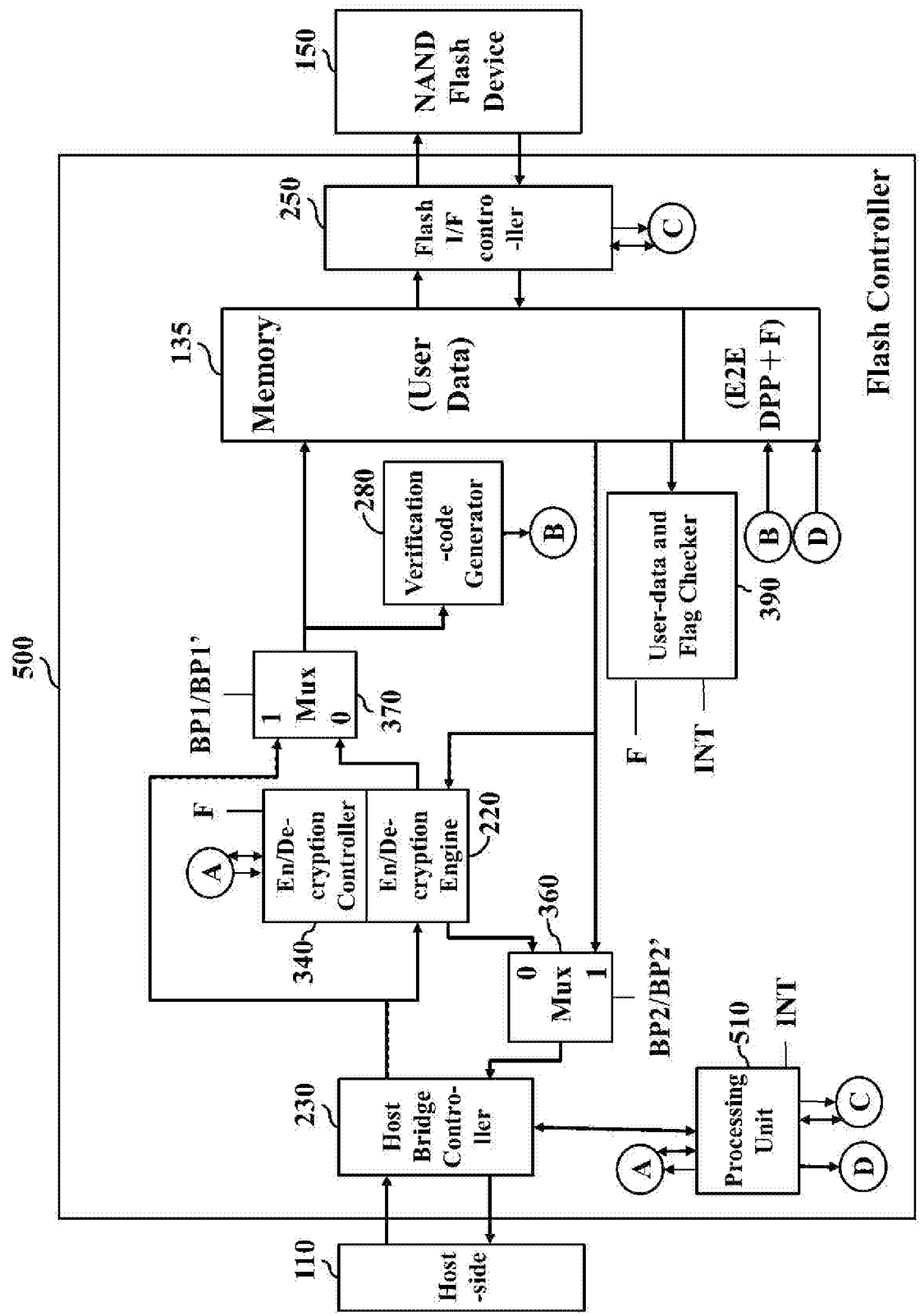

In some embodiments, a flash controller does not use the data verification-code and flag generator 380 as shown in FIG. 2 to generate a bypass flag, but a processing unit instead. Reflecting to the above changes, functions, circuits and interconnections of several components of FIG. 2 may be modified and the modified results may refer to FIG. 5. A flash controller 500 is equipped with a processing unit 510 coupled between the host bridge controller 230, the encryption-and-decryption controller 340 and the memory 135.

When interpreting that the command received from the host bridge controller 230 is a host write command, the processing unit 510 determines whether the host-side 110 instructs the flash controller 130 to activate the encryption function. When the encryption function is not activated, the processing unit 510 not only issues a control signal to the encryption-and-decryption controller 340, but also outputs the bypass flag being "1" indicating that the corresponding user data hasn't been encrypted to the remaining bit of the space of the memory 135 that is originally allocated to store an E2E DPP. When the encryption function is activated, the processing unit 510 not only issues a control signal to the encryption-and-decryption controller 340, but also outputs the bypass flag being "0" indicating that the corresponding user data has been encrypted to the remaining bit of the space of the memory 135 that is originally allocated to store an E2E DPP.

Functions, circuits and operations of other components of the flash controller 500 that are not described, and generic functions, circuits and operations of the components with the same names, as shown in the flash controller 500, may refer to the descriptions of the corresponding components of FIGS. 1 and 2, and are omitted herein for brevity.

Since the data verification-code and flag generator 380, the DMA controller 430 and the processing unit 510 are capable of generating and writing bypass flags, the above components may be referred to as bypass-flag writing circuits.

The processing unit 210, 310 or 510 may be implemented in numerous ways, such as with general-purpose hardware (e.g., a single processor, a multiprocessor capable of parallel computations, or others) that is programmed using firmware or software instructions to perform the functions recited herein.

Although the embodiments of the invention describe the techniques of programming and reading one section of data as an example, those artisans may extend relevant components of the flash controller to program and read multiple sections of the user data, the E2E DPP and the bypass flag at once, the invention should not be limited thereto.

Figure 7:
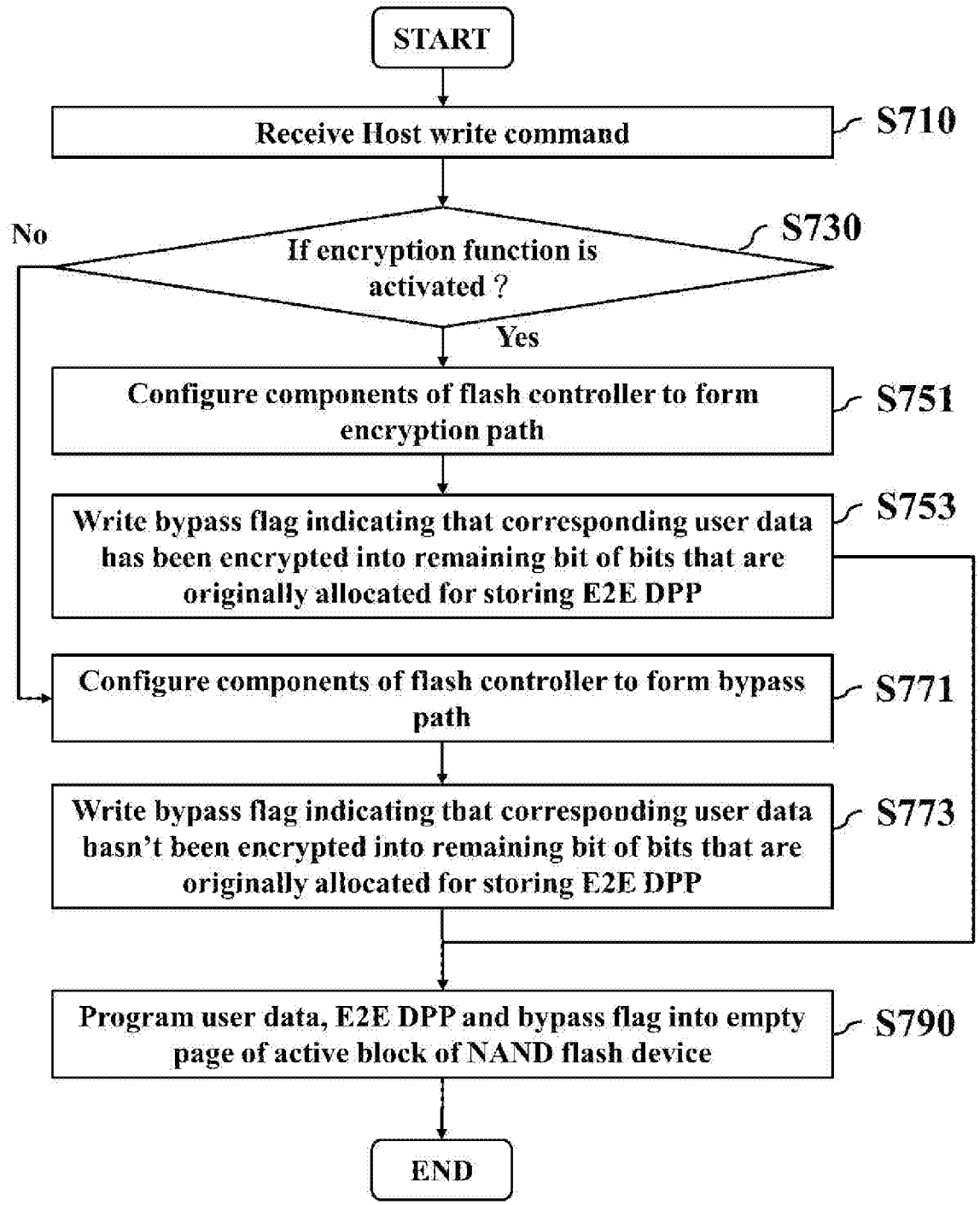
FIG. 7 is a flowchart illustrating a method for programming data according to an embodiment of the invention.

Refer to FIG. 7 showing a method for programming data, performed by the flash controller 200, 400 or 500, in which each step is realized by one or more components of the flash controller 200, 400 or 500. The steps are described as follows:

Step S710: A host write command is received from a host-side. The processing unit 310 or 510 may interpret a command received through the host bridge controller 230 as the host write command.

Step S730: It is determined whether the encryption function is activated. If so, the process proceeds to step S751. Otherwise, the process proceeds to S771. The processing unit 310 or 510 may complete the determination according to a setting of a designated register of the flash controller or information carried in the host write command.

Step S751: Components of the flash controller are configured to form an encryption path. The encryption-and-decryption controller 340 may complete the configuration by issuing a signal BP1' to the Mux 370 or the De-Mux 450.

Step S753: The bypass flag indicating that the corresponding user data has been encrypted is written into the remaining bit of bits that are originally allocated for storing an E2E DPP. The step may be achieved by the data verification-code and flag generator 380, the DMA controller 430 or the processing unit 510.

Step S771: Components of the flash controller are configured to form a decryption path. The encryption-and-decryption controller 340 may complete the configuration by issuing a signal BP1 to the Mux 370 or the De-Mux 450.

Step S773: The bypass flag indicating that the corresponding user data hasn't been encrypted is written into the remaining bit of bits that are originally allocated for storing an E2E DPP. The step may be achieved by the data verification-code and flag generator 380, the DMA controller 430 or the processing unit 510.

Step S790: The user data, the E2E DPP and the bypass flag of a memory are programmed into an empty page of an active block of a NAND flash device. The processing unit 310 or 510 may drive the flash I/F controller 250 to complete the programming operation.

Figure 8:
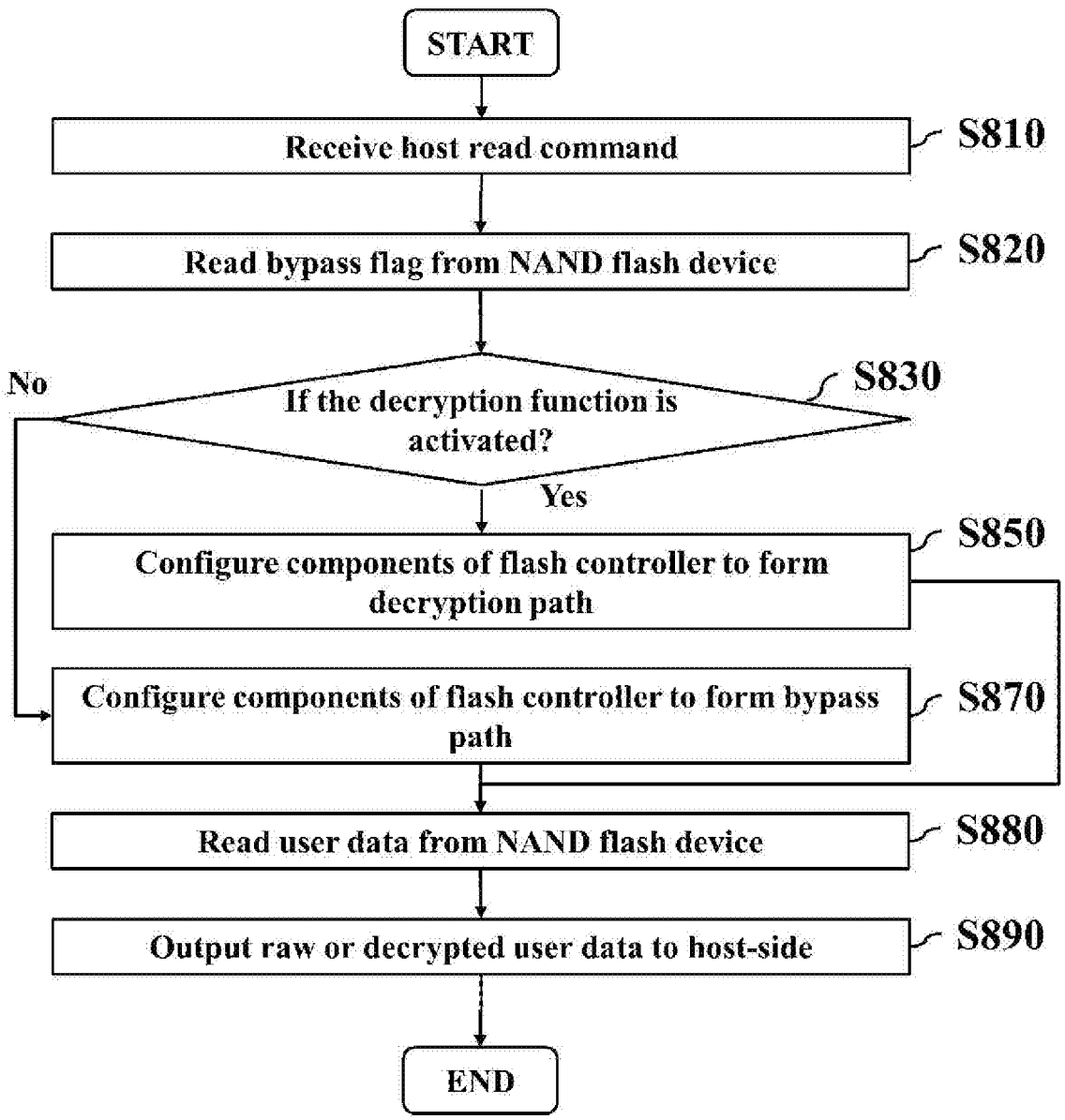
FIG. 8 is a flowchart illustrating a method for reading data according to an embodiment of the invention.

Refer to FIG. 8 showing a method for reading data, performed by the flash controller 200, 400 or 500, in which each step is realized by one or more components of the flash controller 200, 400 or 500. The steps are described as follows:

Step S810: A host read command is received from a host-side. The processing unit 310 or 510 may interpret a command received through the host bridge controller 230 as the host read command.

Step S820: A bypass flag indicating whether user data to be read by the host read command has been encrypted is read from a NAND flash device, where the bypass flag is stored in a remaining bit of bits that are originally allocated for an E2E DPP. The processing unit 310 or 510 may drive the flash I/F controller 250 to complete the reading operation to the NAND flash device 150.

Step S830: It is determined whether the decryption function is activated. If so, the process proceeds to step S850. Otherwise, the process proceeds to S870. The user-data and flag checker 390 may complete the determination according to the bypass flag.

Step S850: Components of the flash controller are configured to form a decryption path. The encryption-and-decryption controller 340 or 470 may complete the configuration by issuing a signal BP2' to the Mux 370.

Step S870: Components of the flash controller are configured to form a bypass path. The encryption-and-decryption controller 340 or 470 may complete the configuration by issuing a signal BP2 to the Mux 370.

Step S880: The user data is read from the NAND flash device. The processing unit 310 or 510 may drive the flash I/F controller 250 to complete the read operation to the NAND flash device 150.

Step S890: The raw or decrypted user data is output to the host-side. To complete the operation, the processing unit 310 may drive the host bridge controller 230 or the processing unit 510 may drive the DMA controller 430.

Process steps executed by the processing unit 210, 310 or 510 may be realized by a computer program product composed of one or more functional modules. The functional modules may be stored in a non-volatile storage device and can be loaded and executed by the processing unit 210, 310 or 510 at relevant time points. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1 to 5, it should be noted that additional elements may be included to achieve better performance without departing from the spirit of the invention. Each element of FIGS. 1 to 5 is composed of various circuits and arranged to operably perform the aforementioned operations. While the process flows described in FIGS. 7 and 8 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for encrypting and decrypting user data, comprising:
   a memory;
   an encryption-and-decryption control circuit, arranged to operably output an indication signal to indicate whether user data has been encrypted;
   a bypass-flag writing circuit, coupled to the memory and the encryption-and-decryption control circuit, arranged to operably write a bypass flag in a remaining bit of space of the memory that is originally allocated for storing an End-to-End Data Path Protection (E2E DPP), wherein the bypass flag indicates whether the user data has been encrypted;

a flash interface control circuit, coupled to a flash device and the memory, arranged to operably read the user data, the E2E DPP and the bypass flag from the memory and program the user data, the E2E DPP and the bypass flag into the flash device, wherein the E2E DPP is generated according to the user data and is arranged to determine whether read data has error bits, wherein the bypass-flag writing circuit comprises:
a verification-code generator, arranged to operably generate the E2E DPP according to the user data and store the E2E DPP in originally allocated space of the memory; and
a first multiplexer, arranged to operably output "1" or "0" to the remaining bit of the space of the memory according to the indication signal output from the encryption-and-decryption control circuit,
wherein the encryption-and-decryption control circuit is arranged to operably control a second multiplexer to connect to the memory and a host bridge control circuit to form a bypass path when the bypass flag indicates that corresponding user data hasn't been encrypted during a data read, and control the second multiplexer to connect to a decryption engine and the host bridge control circuit to form a decryption path when the bypass flag indicates that corresponding user data has been encrypted during a data read.

2. The apparatus of claim 1, wherein the bypass-flag writing circuit comprises:
a verification-code generator, arranged to operably generate the E2E DPP according to the user data and store the E2E DPP in originally allocated space of the memory; and
a multiplexer, arranged to operably output "1" or "0" to the remaining bit of the space of the memory.

3. The apparatus of claim 2, wherein the verification-code generator is a 15-bit Cyclic Redundancy Check (CRC) encoder.

4. The apparatus of claim 1, comprising:
a user-data and flag checking circuit, coupled to the memory,
wherein the flash interface control circuit is arranged to operably read the user data and the bypass flag from the flash device and store them in the memory, the user-data and flag checking circuit is arranged operably to read the bypass flag from the memory and outputs the bypass flag to an encryption-and-decryption control circuit, and the encryption-and-decryption control circuit is arranged to operably configure a decryption path or a bypass path that makes the user data passed through according to the bypass flag,
wherein the decryption path comprises an encryption-and-decryption engine, the bypass path does not include the encryption-and-decryption engine, and the encryption-and-decryption engine is arranged to operably decrypt the user data using a key.

5. The apparatus of claim 4, the encryption-and-decryption control circuit is arranged to operably configure components of the apparatus to form the decryption path or the bypass path.

6. The apparatus of claim 4, wherein the encryption-and-decryption engine implements Advanced Encryption Standard (AES) algorithm.

7. An apparatus for encrypting and decrypting user data, comprising:
a flash interface control circuit, coupled to a flash device, arranged to operably read user data, an End-to-End Data Path Protection (E2E DPP) and a bypass flag from the flash device and store the user data and the bypass flag in a memory, wherein the bypass flag is stored in a remaining bit of space of the memory that is originally allocated for storing the E2E DPP to indicate whether the user data has been encrypted;
a user-data and flag checking circuit, coupled to the flash interface control circuit, arranged to operably read the bypass flag from the remaining bit of space of the memory that is originally allocated for storing the E2E DPP and output the bypass flag received from the flash interface control circuit;
an encryption-and-decryption engine;
a host bridge control circuit;
a multiplexer comprising a first input, a second input and an output, wherein the first input is coupled to the memory, the second input is coupled to the decryption engine and the output is coupled to the host bridge control circuit; and
an encryption-and-decryption control circuit, coupled to the user-data and flag checking circuit, arranged to operably receive the bypass flag, configure the multiplexer to connect to the memory and the host bridge control circuit to form a decryption path that makes decrypted user data passed from the decryption engine to the host bridge control circuit when the bypass flag indicates that the user data has been encrypted, and configure the multiplexer to connect to the memory to the host bridge control circuit to form a bypass path that makes the user data passed from the memory to the host bridge control circuit when the bypass flag indicates that the user data hasn't been encrypted, wherein the encryption-and-decryption engine is arranged to operably decrypt the user data using a key, wherein the E2E DPP is generated according to the user data and is arranged to determine whether read data has error bits, wherein the user-data and flag checking circuit comprises a user-data checking circuit, arranged to operably determine whether the user data has error bits according to the user data and the E2E DPP.

8. The apparatus of claim 7, wherein the encryption-and-decryption control circuit is arranged to operably configure components of the apparatus to form the decryption path or the bypass path.

9. The apparatus of claim 7, comprising:
a host bridge control circuit, coupled to the decryption path or the bypass path, arranged to operably output the user data or the decrypted user data to a host-side.

10. The apparatus of claim 7, comprising:
a Direct Memory Access (DMA) controller, coupled to the decryption path or the bypass path, arranged to operably store the user data or the decrypted user data in a Dynamic Random Access Memory (DRAM) outside of the apparatus, thereby enabling a host-side to obtain the user data or the decrypted user data from the DRAM.

11. A method for encrypting and decrypting user data, comprising:
preparing, by a bypass-flag writing circuit, an End-to-End Data Path Protection (E2E DPP) and a bypass flag;
programming, by a flash interface control circuit, user data, the E2E DPP and a bypass flag into a flash device, wherein the bypass flag is stored in a remaining bit of space of the flash device that is originally allocated for storing the E2E DPP, and the bypass flag indicates whether the user data has been encrypted, wherein the E2E DPP is generated according to the user data and is arranged to determine whether read data has error bits;

reading, by the flash interface control circuit, the bypass flag from the flash device;

controlling, by an encryption-and-decryption control circuit, a second multiplexer to connect to a memory and a host bridge control circuit to form a first bypass path when the bypass flag indicates that the user data hasn't been encrypted during a data read;

controlling, by the encryption-and-decryption control circuit, the second multiplexer to connect to a decryption engine and the host bridge control circuit to form a decryption path when the bypass flag indicates that the user data has been encrypted during a data read, wherein the bypass-flag writing circuit comprises:

a verification-code generator, arranged to operably generate the E2E DPP according to the user data and store the E2E DPP in originally allocated space of the memory; and a first multiplexer, arranged to operably output "1" or "0" to the remaining bit of the space of the memory according to an indication signal output from an encryption-and-decryption control circuit, wherein the indication signal indicates whether the user data has been encrypted.

12. The method of claim 11, comprising:

programming "1" or "0" into the remaining bit of the flash device according to a setting of a register or information carried by a host write command.

13. The method of claim 11, comprising:

configuring an encryption path or a second bypass path according to a setting of a register or information carried by a host write command, wherein the encryption path comprises an encryption-and-decryption engine, the second bypass path does not include the encryption-and-decryption engine and the encryption-and-decryption engine encrypts the user data using a key.

14. The method of claim 11, comprising:

outputting the user data to a host-side.

15. The method of claim 11, wherein the method is performed by a flash controller coupled between the flash device and a host-side.

16. The method of claim 11, wherein the E2D DPP is a 15-bit Cyclic Redundancy Check (CRC) and a length of the remaining bit is one.

* * * * *